(12) United States Patent
Ogura et al.

(10) Patent No.: US 8,113,714 B2
(45) Date of Patent: Feb. 14, 2012

(54) LINEAR MOTION GUIDE UNIT

(75) Inventors: Hideaki Ogura, Kanagawa (JP);
Toshiaki Geka, Kanagawa (JP)

(73) Assignee: Nippon Thompson Co., Ltd., Tokyo (JP)

( * ) Notice: Subject to any disclaimer, the term of this patent is extended or adjusted under 35 U.S.C. 154(b) by 377 days.

(21) Appl. No.: 12/410,937

(22) Filed: Mar. 25, 2009

(65) Prior Publication Data

US 2009/0245701 A1    Oct. 1, 2009

(30) Foreign Application Priority Data

Mar. 26, 2008   (JP) ................................. 2008-081553

(51) Int. Cl.
*F16C 33/10* (2006.01)

(52) U.S. Cl. .......................................... 384/13

(58) Field of Classification Search .................... 384/13, 384/43, 44, 45
See application file for complete search history.

(56) References Cited

U.S. PATENT DOCUMENTS

| | | | | |
|---|---|---|---|---|
| 6,155,717 | A * | 12/2000 | Michioka et al. | 384/13 |
| 6,401,867 | B1 * | 6/2002 | Michioka et al. | 384/13 |
| 6,705,430 | B2 * | 3/2004 | Michioka et al. | 184/5 |
| 7,410,300 | B2 * | 8/2008 | Chen et al. | 384/13 |
| 2007/0223845 | A1 * | 9/2007 | Kakei et al. | 384/45 |

FOREIGN PATENT DOCUMENTS

JP          2007255498         10/2007

* cited by examiner

*Primary Examiner* — Michael P Ferguson
(74) *Attorney, Agent, or Firm* — Cozen O'Connor

(57) ABSTRACT

By reducing the component count, a more compact linear motion guide unit having sealing structures capable of maintaining high sealing performance between slider and guide rail over a long term is realized. A rubber-made end seal, attached to each end face of a slider slidably straddling a guide rail, has a lip portion integrally formed on a contact face with the guide rail, and a recessed portion formed in a face opposite to a mounting face attached to the slider. A positional relationship is determined such that the lip portion is located closer to the slider than the recess bottom face is. An oil-impregnated wiper seal is mounted in the recessed portion of the end seal. A scraper is disposed along the outer side of the wiper seal mounted in the recessed portion, so that the wiper seal is fixedly interposed between the scraper and the recess bottom face.

4 Claims, 11 Drawing Sheets

Fig 7 *Prior Art*
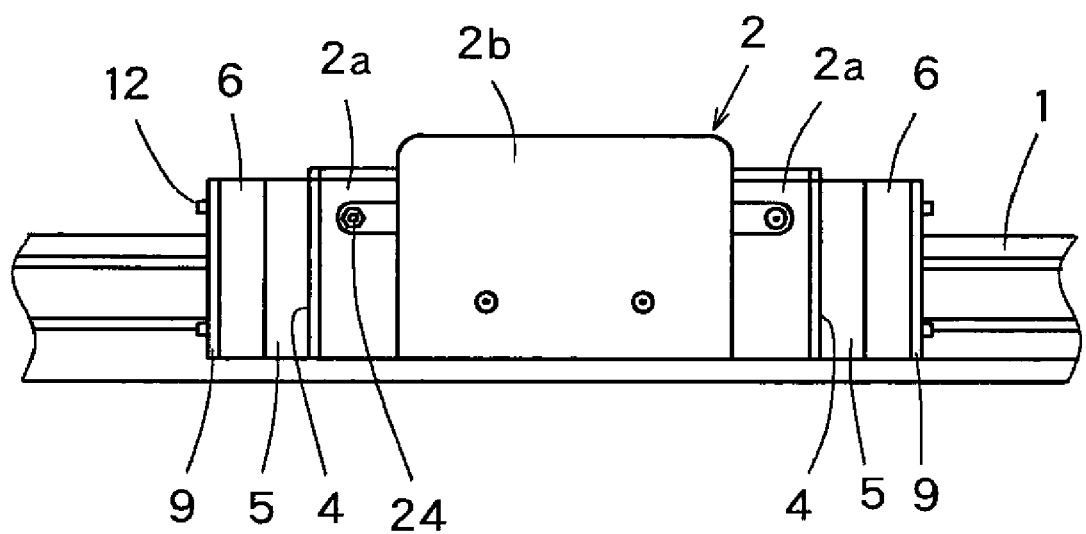

Fig 8  *Prior Art*
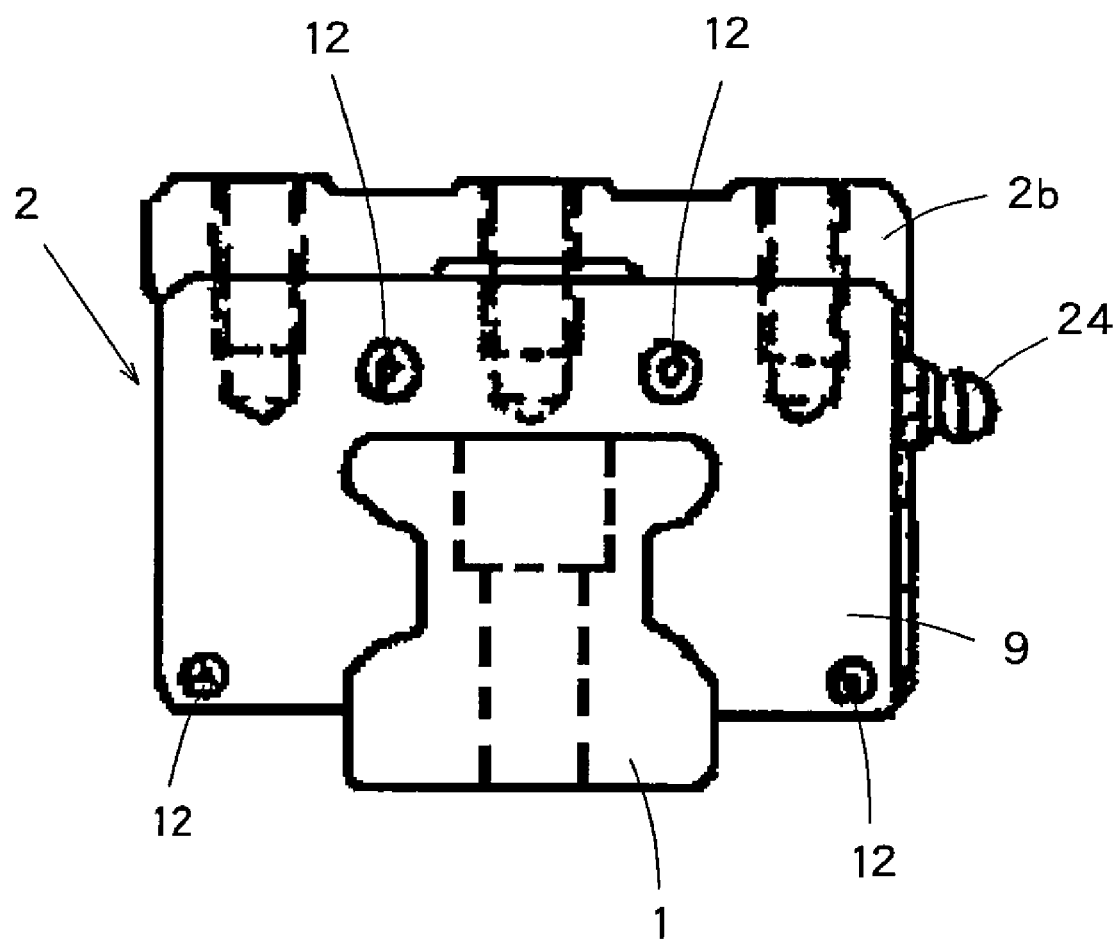

Fig 9   *Prior Art*
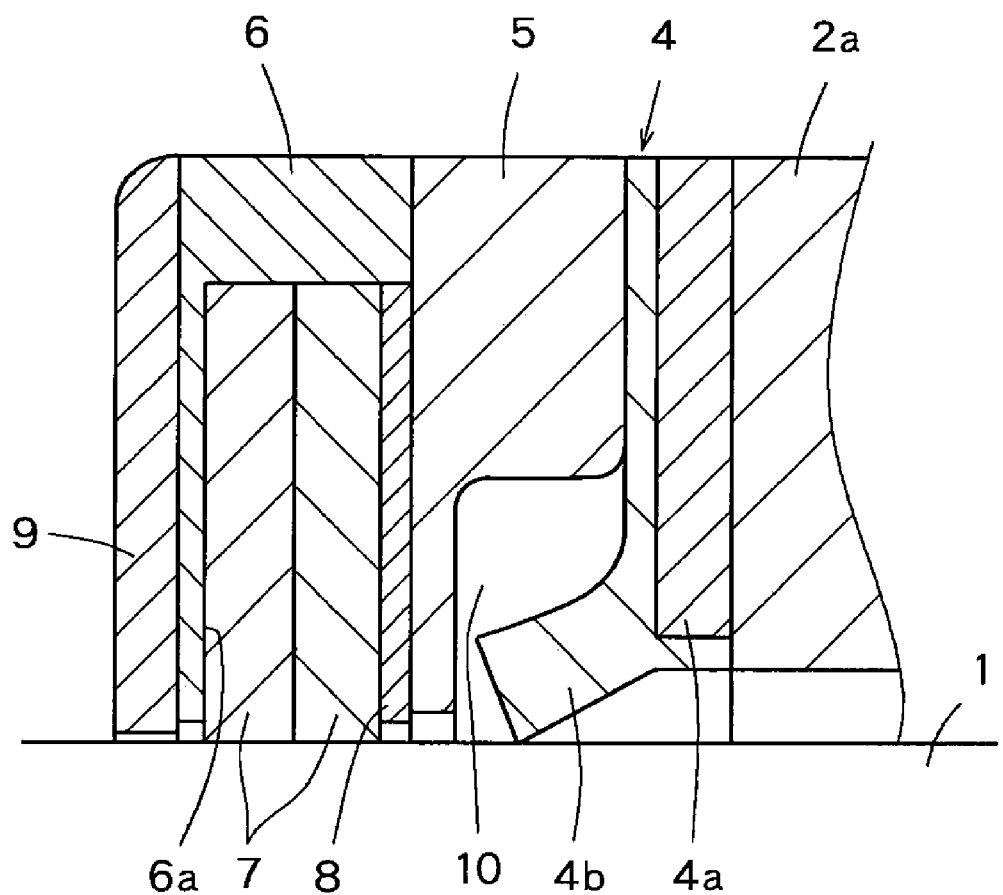

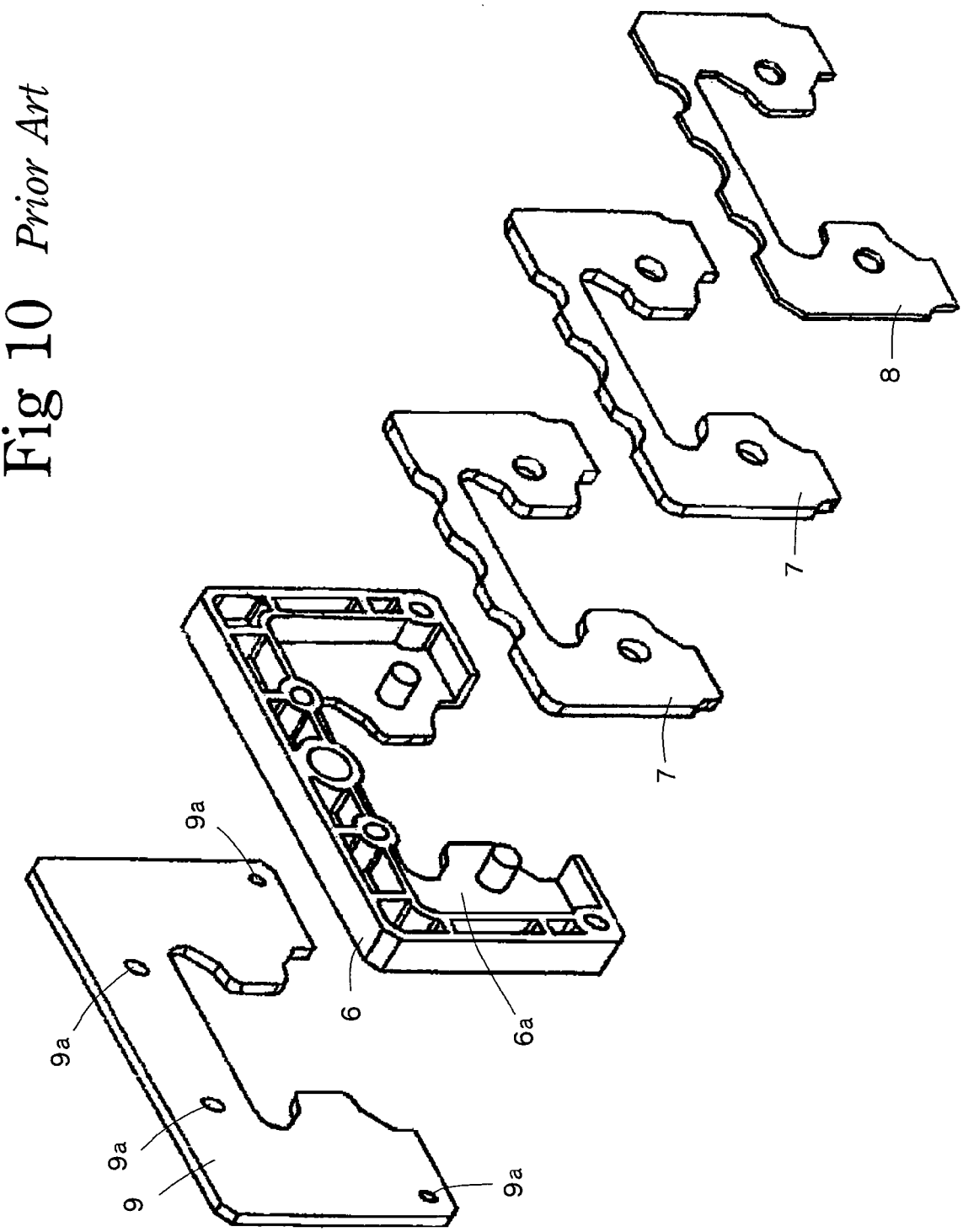
Fig 10 *Prior Art*

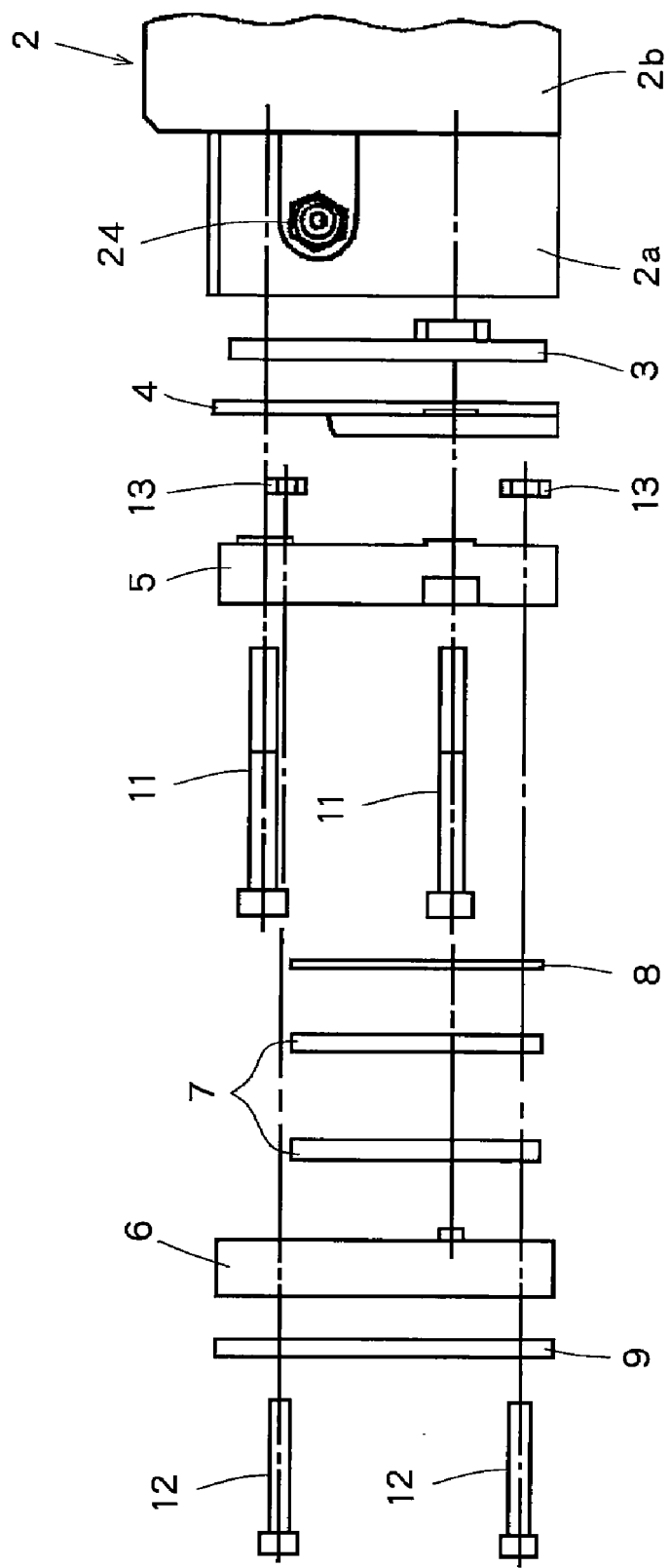
Fig 11 *Prior Art*

LINEAR MOTION GUIDE UNIT

BACKGROUND OF THE INVENTION

1. Field of the Invention

This invention relates to a linear motion guide unit suitable for use in environments where foreign substances are likely to be encountered, such as in a machine tool.

2. Description of the Related Art

Conventionally, linear motion guide units are used, for example, for proper positioning of a workpiece on a machine tool, and these days a linear motion guide unit without a cover or the like is increasingly often used with unprotected guide rails with a view to a reduction in size and in cost of the apparatus. When such a linear motion guide unit with unprotected guide rails is used in an environment where foreign substances such as chippings are generated, the foreign substances adhere to the surfaces of the guide rails. If the adhering foreign substances enter the slider or the sliding face of the guide rail, they may interrupt the smooth movement of the slider, causing a failure.

To avoid this, a seal member is provided on the outer side of the slide to prevent foreign substances from entering the sliding area. A linear motion guide unit is additionally provided with a scraper outside the seal member, or it alternatively supplies oil to a guiding face for suspending the foreign substances, in order to keep them out.

Among the linear motion guide units of such a type, Japanese Patent Application No. 2007-319697 filed by the present applicant discloses in particular one designed to be capable of sufficiently supplying oil to the guiding face, with improved durability of the sealing member.

As shown in FIGS. 7 and 8, the conventional linear motion guide unit comprises a guide rail 1 and a slider 2 slidably straddled on the guide rail 1, and also rubber end seals 4 which are respectively mounted on the outer sides of the end caps 2a respectively attached to the opposing ends of the slider 2. In addition, resin-made wiper seal assemblies 6 are respectively mounted on the outer sides of the end seals 4 with the interposition of resin-made mounting plates 5.

As shown in FIG. 9, each of the end seals 4 is formed of rubber baked on a cored bar 4a, and includes a lip 4b having an end pressed against the guide rail 1 so as to seal the gap between the slider 2 and the guide rail 1.

The mounting plate 5 attached to the outer side of the end seal 4 is shaped to create a space 10 on the side facing the end seal 4 for protecting the lip 4b as shown in FIG. 9.

The wiper seal assembly 6 attached to the outer side of the mounting plate 5 has a recessed portion with a bottom face 6a facing toward the end seal 4 as shown in FIGS. 9 and 10. In the recessed portion, two oil-impregnated wiper seals 7 and a metal-made sealing plate 8 are mounted. The sealing plate 8 is provided for giving firmness to the wiper seals 7, which are oil-impregnated materials, to prevent them from being easily deformed. In turn, a scraper 9 is provided on the outer side of the wiper seal assembly 6.

As illustrated in FIG. 11, the mounting plate 5, the end seal 4 and the end cap 2a are secured to the casing 2b of the slider 2 with bolts 11. Then, the scraper 9 and the wiper seal assembly 6 are secured to the mounting plate 5 from outside the scraper 9 with other bolts 12 and nuts 13 provided on the mounting plate 5. The reason for such use of two sets of bolts 11, 12 is that, when all the components are mounted on the outside of the end cap 2a, the length in the sliding direction of the slider 2 is increased, causing the difficulty in using one set of long bolts to mount all the components.

Note that reference numeral 3 in FIG. 11 denotes an oil-impregnated member fitted into a recessed portion formed in an end face of the end cap 2a. The oil-impregnated member 3 is placed more inward than the end seal 4 for supplying oil to rolling elements and/or the like which are set in the end cap 2a.

In a linear motion guide unit as described above, when the slider 2 reciprocates, large foreign substances on the guide rail 1 are removed by the scraper 9, and the foreign substances slipping through the scraper 9 are prevented from entering the slider 2 by the wiper seals 7 and the end seal 4. In particular, the oil supplied from the wiper seals 7 and the sliding movement of the wiper seals 7 makes it possible for the foreign substances to enter the internal area with respect to the end seal 4. As a result, the end seal 4 can maintain its high sealing performance over a long term without being damaged by foreign substances.

As described above, a conventional linear motion guide unit has an arrangement in which an end seal 4, a mounting plate 5, a wiper seal assembly 6 containing wiper seals 7 and a sealing plate 8, and a scraper 9 are disposed in this order on the outer side of each of the end caps 2a of the slider 2. In this manner, the conventional linear motion guide unit having high sealing performance includes a large number of components mounted on the opposing ends of the slider 2. For this reason, much time and effort are required for mounting each component. In addition, the size of the slider 2 in the sliding direction is increased, thus disadvantageously causing the impossibility of a reduction in size of the linear motion guide unit.

SUMMARY OF THE INVENTION

It is an object of the present invention to reduce the number of components to realize a more compact linear motion guide unit having sealing structures capable of maintaining high sealing performance between slider and guide rail over a long term.

To attain this object, a first aspect of the present invention provides a linear motion guide unit comprising: a guide rail having a guiding face extending in the longitudinal direction; a slider straddling and sliding on the guide rail; an end seal attached to each of end faces of the slider and straddling the guide rail, and made of rubber and having a lip portion integrally formed on a contact face with the guide rail; and wiper seals provided on an outer side of the end seal and impregnated with oil. In the linear motion guide unit, the end seal has a recessed portion formed in a face opposite to a mounting face attached to the slider. The lip portion is located closer to the slider than a bottom face of the recessed portion is. The wiper seals impregnated with oil are mounted in the recessed portion, and a scraper disposed along the outer side of the wiper seals mounted in the recessed portion, so that the wiper seals are fixedly interposed between the scraper and the bottom face of the recessed portion.

To attain the above object, a second aspect of the present invention provides a linear motion guide unit comprising: a guide rail having a guiding face extending in the longitudinal direction; a slider straddling and sliding on the guide rail; a plurality of end seals attached to each of end faces of the slider and straddling the guide rail, and made of rubber and respectively having lip portions integrally formed on contact faces with the guide rail; and a wiper seal provided on an outer side of each of the end seals and impregnated with oil. In the linear motion guide unit, each of the end seals has a recessed portion formed in a face opposite from the slider. Each of the lip portions is located closer to the slider than a bottom face of the corresponding recessed portion is. The wiper seal impregnated with oil is mounted in the corresponding recessed portion. The plurality of the end seals are placed on one another so that the wiper seal is fixedly interposed between the end seals, and a scraper disposed along the outer side of the wiper seal mounted in the recessed portion of an outermost situated end seal of the plurality of the end seals, so that the wiper seal of the outermost situated end seal is fixedly interposed between the scraper and the bottom face of the recessed portion.

Preferably, a metal-made sealing plate is interposed between the bottom face of the recessed portion and the wiper seal.

Preferably, a reinforcing rib is formed on the bottom face of the recessed portion of the end seal, and a through-hole is drilled in the center of the rib through the end seal. A bar-shaped reinforcing member is preferably inserted through the through-hole.

Preferably, the wiper seal is a sheet-shaped member produced by compressively molding polyester-based polyurethane foam having three-dimensional skeleton structure with well-defined open pores, in the thickness direction.

According to the present invention, it is possible to reduce the number of components of a linear motion guide unit having sealing structure capable of maintaining high sealing performance between slider and guide rail over the long term and also to make the linear motion guide unit more compact.

According to the second aspect of the present invention, the provision of a plurality of end seals allows the achievement of higher sealing performance.

According to the present invention, firmness can be given to the wiper seal, making it possible to stabilize the function of the wiper seal. In addition, it is possible to prevent the occurrence of adverse effects, for example, if the wiper seal is bent and comes into contact with the lip portion of the end seal.

According to the present invention, the end seal is inhibited from deforming in the sliding direction to allow the lip portion to maintain its stable sealing performance.

BRIEF DESCRIPTION OF THE DRAWINGS

FIG. 7 is a front view of a conventional linear motion guide unit.

FIG. 8 is a side view of a conventional linear motion guide unit.

FIG. 9 is a sectional view of a sealing area in a conventional linear motion guide unit.

FIG. 10 is an exploded view of a wiper seal assemble in a conventional linear motion guide unit.

FIG. 11 is an exploded view illustrating one of the opposing ends of a conventional slider.

DETAILED DESCRIPTION OF THE PREFERRED EMBODIMENTS

A first embodiment according to the present invention will be described below.

Figure 1:
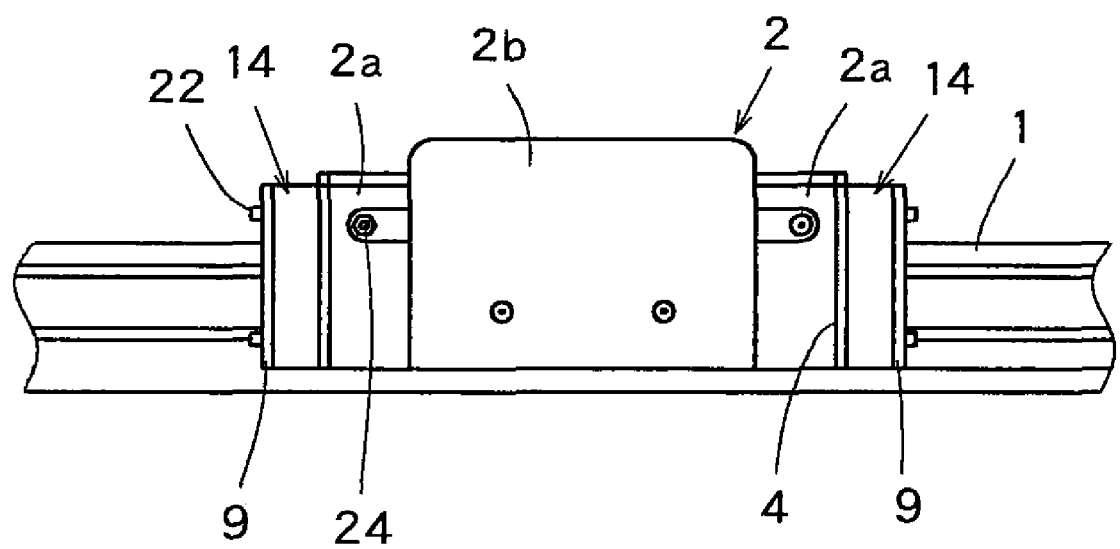
FIG. 1 is a front view of a linear motion guide unit of a first embodiment according to the present invention.

A linear motion guide unit according to the first embodiment comprises a slider 2 straddled and slidably mounted on a guide rail 1 as illustrated in FIG. 1. The guide rail 1 and the slider 2 are identical in structure with those of a conventional linear motion guide unit as illustrated in FIGS. 7 and 8. The slider 2 is in contact with the guiding face of the guide rail 1 through rolling elements (not shown) which roll through each of the end caps 2a for a change in travel direction. The end cap 2a of the slider 2 has a lubricating oil supply port drilled therein and a grease nipple 24 is attached to the lubricating oil supply port.

As the linear motion guide unit of the present invention, the internal structure of the slider 2, the shape of the rail, and the like are not limited as long as the slider 2 can move back and forth along the guide rail 1.

Figure 2:
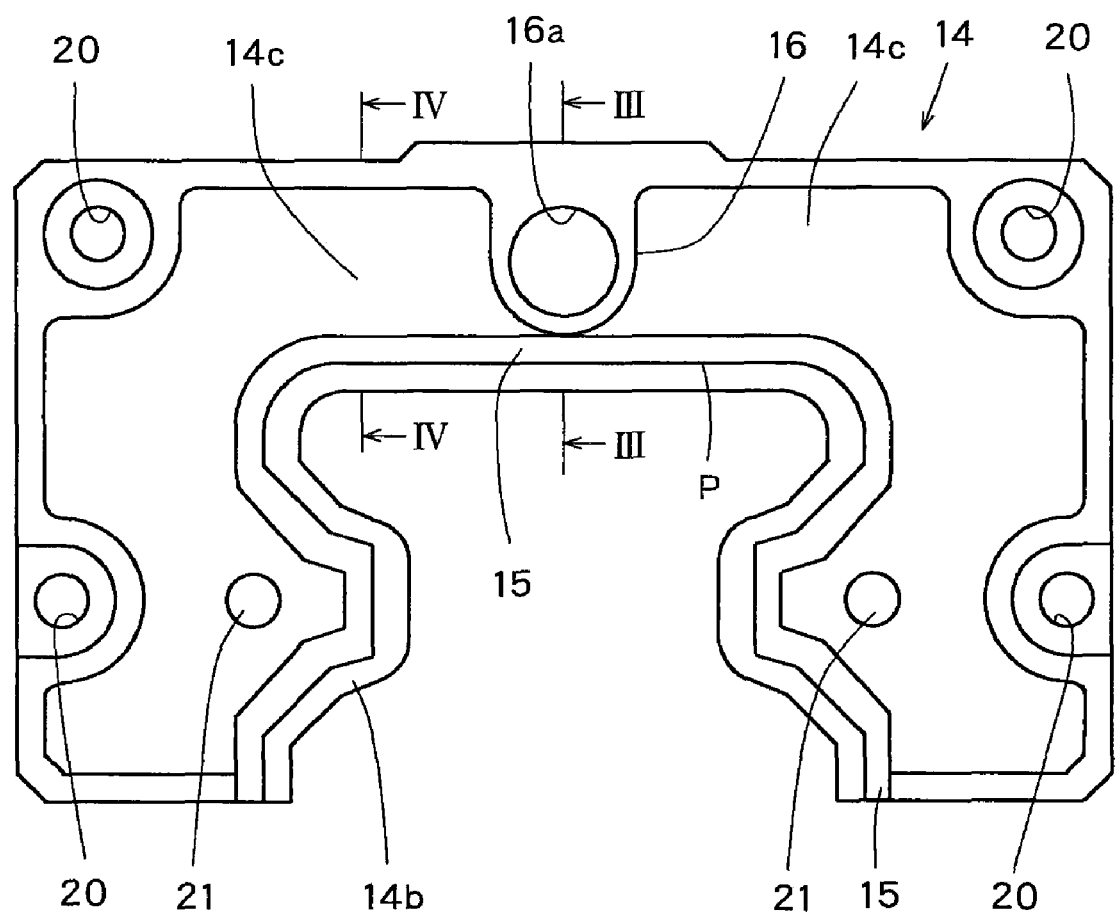
FIG. 2 is a plan view of an end seal of the first embodiment.
Figure 3:
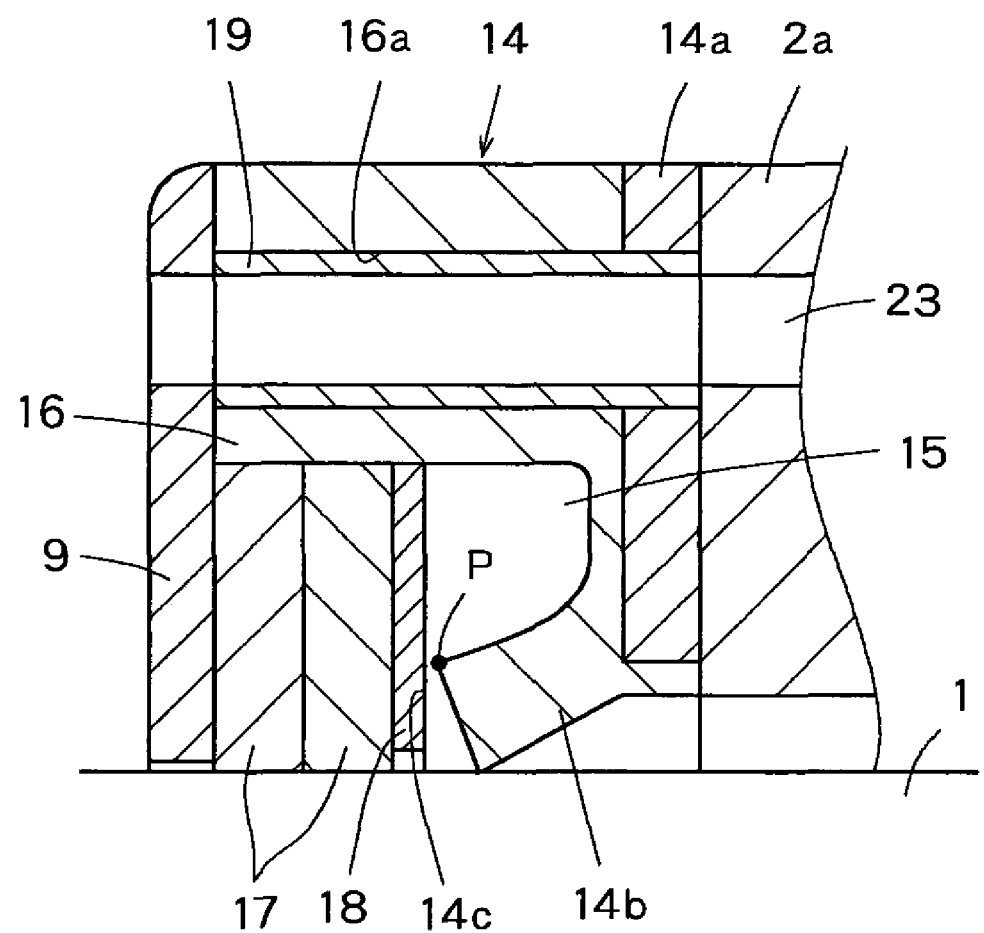
FIG. 3 is a sectional view of the end seal, with wiper seals mounted therein, attached to an end cap in the first embodiment, which corresponds to a sectional view taken along the III-III line in FIG. 2.

In the first embodiment, as illustrated in FIGS. 2 and 3, an end seal 14 in which wiper seals 17 and a sealing plate 18 are mounted, and a scraper 9 are attached to the outer side of each of the end caps 2a of the slider 2. The outer side face of the end cap 2a corresponds to an end face of the slider of the present invention.

Although the wiper seal 17, the sealing plate 18 and the scraper 9 have the same functions as those of the wiper seal 7, the sealing plate 8 and the scraper 9 which are conventionally employed, the mounting of the sealing plate 18 and the wiper seals 17 in the end seal 14 is the biggest advantage of the first embodiment.

Figure 4:
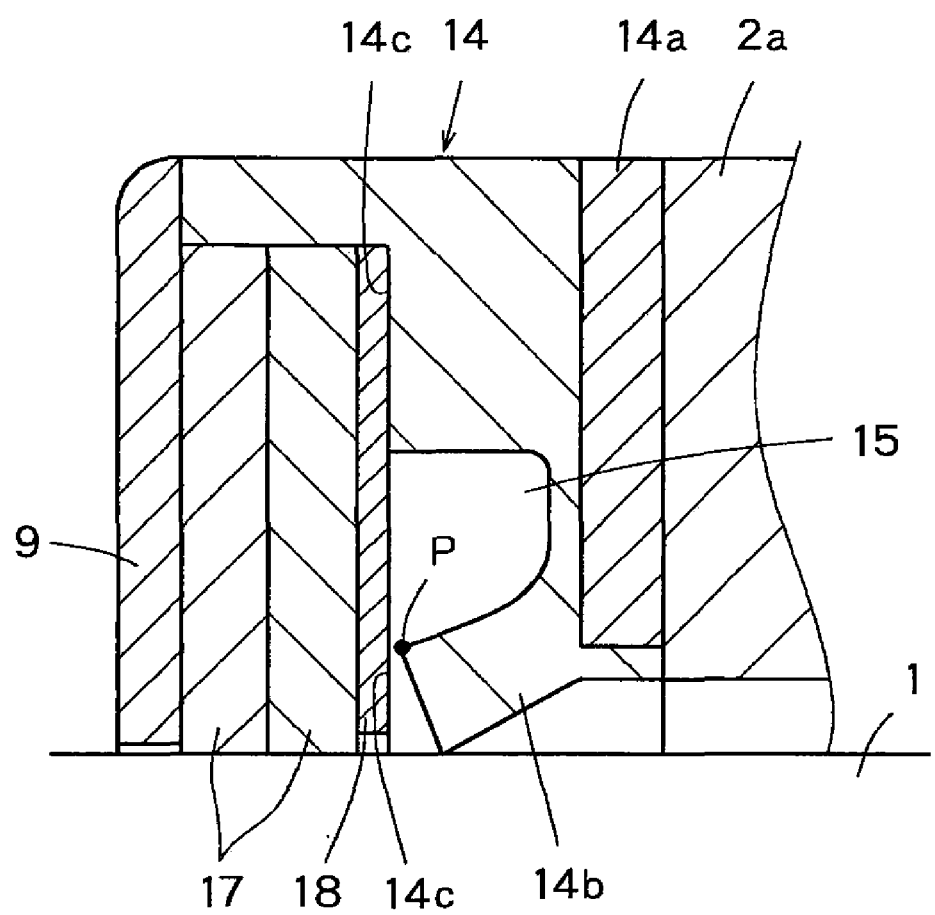
FIG. 4 is a sectional view of the end seal, with wiper seals mounted therein, attached to an end cap in the first embodiment, which corresponds to a sectional view taken along the IV-IV line in FIG. 2.

As shown in FIGS. 2 to 4, the end seal 14 of the first embodiment is formed of rubber baked on a cored bar 14a, and has a lip portion 14b provided on a portion straddling the guide rail 1.

The end seal 14 is shaped to have a recessed portion formed on the outer side, that is, in the outer face 14d opposite from the slider 2 when the end seal 14 is attached to the end cap 2a of the slider 2. The bottom face of this recessed portion is herein referred as a recess bottom face 14c. As illustrated in FIGS. 3 and 4, the end seal includes a protruding portion 14e extending between the recess bottom face 14c and the outer face 14d of the end seal 14 and which partially surrounds the recess bottom face 14c. As also seen in FIGS. 3 and 4, the leading end P outermost located in the lip portion 14b is located closer to the slider 2 than the recess bottom face 14c is. In other words, the entire lip portion 14b is located closer to the slider 2 than the recess bottom face 14b is. If such a positional relationship is maintained, the sealing plate 18 mounted in contact with the recess bottom face 14c can be prevented from coming into contact with the lip portion 14b (see FIGS. 3 and 4).

FIGS. 3 and 4 are sectional views of the sealing area provided on the outer end of each of the end caps 2a, and FIG. 2 shows the lines along which the sectional views in FIGS. 3 and 4 are taken, respectively.

A description will be given of the reasons why the members placed on the outer side of the recess bottom face 14b are provided to be prevented from coming into contact with the lip portion 14b.

The lip portion 14b can moderately deform so as to be pressed against the guide face of the guide rail 1 in order to maintain the sealing performance. If a member such as the sealing plate 18 or the like mounted in the recessed portion comes into contact with the lip portion 14b so that an external force acts on the lip portion 14b, the pressing state of the lip portion 14b against the guide rail 1 may be changed, possibly resulting in impairment of the sealing performance. To avoid this, the foregoing positional relationship is maintained to prevent the lip portion 14b from being adversely affected.

In addition, an oil storage groove 15 is formed in a portion of the end seal 14 between the lip portion 14b and the recess bottom face 14c for storing lubricating oil. The oil storage groove 15 also serves as a space allowing for the deformation of the lip portion 14b after the slider 2 has been mounted on the guide rail 1.

A plurality of bolt holes 20 are drilled near the outer periphery of the end seal 14. Positioning pins 21 and a rib 16 for reinforcement in the present invention are provided on the recess bottom face 14c. The rib 16 has a through-hole 16a drilled through which a bar-shaped reinforcing member of the present invention, which will be described later, is inserted.

Figure 5:
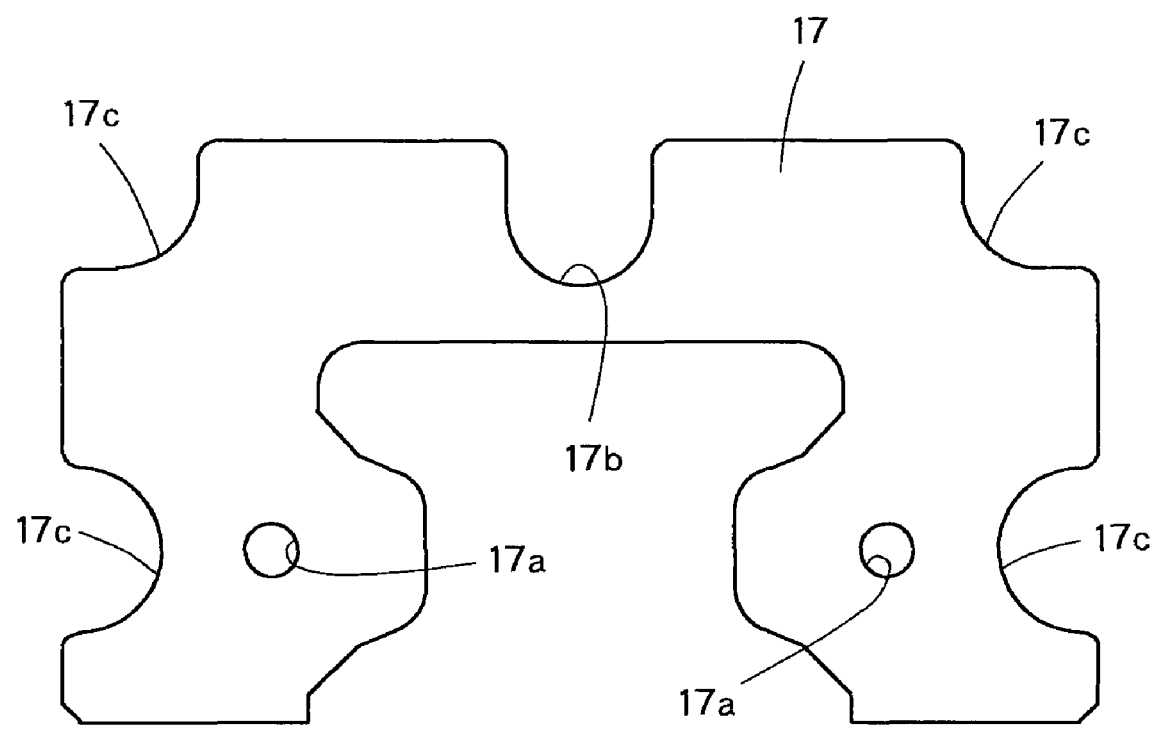
FIG. 5 is a plan view of the wiper seal of the first embodiment.

Each of the wiper seals 17 illustrated in FIGS. 3 to 5 is a sheet-shaped member made of a foamed resin and has a pair of positioning holes 17a drilled therein (see FIG. 5), as in the case of the conventional wiper seal 7. The wiper seal 17 is shaped such that it is exactly fitted in the recessed portion of the end seal 14 when the positioning pins 21 of the end seal 14 are respectively inserted into the positioning holes 17a. In addition, the wiper seal 17 has cutaway portions 17b and 17c formed in the outer periphery thereof. The cutaway portion 17b is shaped to correspond to the rib 16 of the end seal 14, while the cutaway portions 17c are respectively shaped to correspond to the ribs formed around the respective bolt holes 20. The positioning is achieved by those ribs and the cutaway portions.

The sealing plate 18, which is also mounted in the end seal 14, is a metallic plate as in the case of the conventional sealing plate 8, which is provided for giving firmness to the wiper seals 17. The shape of the sealing plate 18, which is not shown in particular, is approximately the same as that of the wiper seal 17 illustrated in FIG. 5, but the sealing plate 18 has a larger opening that that of the wiper seal 17 for straddling the guide rail 1. The sealing plate 18 also has positioning holes formed corresponding to the position holes 17a of the wiper seal 17, so that when the positioning pins 21 of the end seal 14 are inserted into these positioning holes, the sealing plate 18 can be held in position out of contact with the guide rail 1 as illustrated in FIGS. 3 and 4. The positioning of the sealing plate 18 out of contact with the guide rail 1 is because the guide rail 1 may be damaged by the metallic sealing plate 18 sliding on the guide rail 1.

In the first embodiment, the sealing plate 18 is mounted in the recessed portion of the end seal 14 as described above. Then, the two stacked wiper seals 17 are placed on the sealing plate 18 in the recessed portion. Then, the scraper 9 is placed over the opening of the recessed portion so as to make face-to-face contact with the wiper seal 17, such that the sealing plate 18 and the wiper seals 17 are fixedly interposed between the scraper 9 and the recess bottom face 14c.

In the embodiment, before attaching the scraper 9, a resin-made tube member 19 which is a reinforcing member of the present invention is inserted through the through-hole 16a of the end seal 14. The tube member 19 has a sufficient length to allow its one end to make contact with the end face of the end cap 2a of the slider and the other end to make contact with the scraper 9. Because of the tube member 19, the distance between the end cap 2a and the scraper 9 can be maintained, thus preventing the end seal 14 from being deformed.

The scraper 9 is similar to the conventional scraper 9 illustrated in FIG. 10. Bolts 22 are respectively inserted from the bolt holes 9a drilled in the scraper 9 through the bolt holes 20 of the end seal 14 and then engaged with screw holes provided in the end cap 2a of the slider 2, thereby mounting the scraper 9, the wiper seals 17, the sealing plate 18 and the end seal 14 on the slider 2.

As described above, a linear motion guide unit of the first embodiment comprises a sealing plate 18 and wiper seals 17 which are mounted in each of end seals 14 before the end seals 14 are attached to a slider 2. For this reason, the linear motion guide unit of the first embodiment is not required to employ additional components such as an assembly for holding a wiper seal and a mounting plate for protecting a lip portion of the end seal as is done in the conventional linear motion guide units. In other words, it is possible to reduce the number of components and shorten the length of the range from each end cap 2a to the outmost end closest to the end cap 2a in the sliding direction as compared with the conventional linear motion guide unit. In consequence, a simple mounting process and a reduction in size of the unit can be realized.

In turn, if a reduction in the distance from the end face of the slider 2 to the scraper 9 is achieved, a single set of bolts is adequate to secure the scraper 9 and the end seal 14 to the slider 2.

The linear motion guide unit of the first embodiment is designed to eventually use a lip portion 14b of each end seal 14 to maintain the sealing of the gap between the slider 2 and the guide rail 1 and use an outermost placed scraper 9 to remove large foreign substances from the guide rail 1, as in the case of the conventional linear motion guide units. Then, the foreign substances slipping through the scraper 9 are removed by the wiper seals 17. The lip portion 14b is protected by oil supplied from the wiper seal 17.

Note that any type of materials for forming the wiper seal 17, for example, a fiber material such as felt or resin foam, can be used as long as it is capable of holding oil. However, among the resin foam, the use of a sheet-shaped member produced by compressively molding polyester-based polyurethane foam having three-dimensional skeleton structure with well-defined open pores in the thickness direction offers the realization of a wiper seal having high wear resistance and exhibiting a high capability of holding, specially, oil as compared with the fiber material such as felt.

The polyester-based polyurethane foam having three-dimensional skeleton structure with well-defined open pores means a material with the surface in which pores of clear contours are formed by removing a foam film from polyester-based polyurethane foam through additional treatment. The well-defined open pores cause an expanded capability of holding oil.

Because of the skeleton structure of the polyester-based polyurethane foam, it is possible to realize high sliding performance and high wear resistance.

In addition, by compressing the polyester-based polyurethane foam in the thickness direction, a more firm sheet-shaped member can be obtained. Because of this, the wiper seal 17 formed of such a material is not easily bent even if it repeatedly slides on the guide rail 1, and can maintain its functions as a wiper seal over a long term.

As a result, the lip portion 14b of the end seal 14 can be protected over a longer term, thus maintaining satisfactory sealing performance and a smooth sliding movement of the slider 2.

In the first embodiment, the metallic sealing plate 18 is disposed closer to the lip portion 14b to give firmness to the wiper seal 17. The reason of giving firmness to the wiper seal 17 in such a manner is that, if the firmness of the wiper seal 17 is too weak, the pressure force of the wiper seal 17 against guide rail 1 may become unstable or the wiper seal 17 may be bent due to repeated sliding movements, possibly resulting in impossibility of removing foreign substances from the guide rail 1. However, the sealing plate 18 is not an essential element. Even when the sealing plate 18 is not provided, it is advantageously possible to achieve a linear motion guide unit comprising wiper seals 17 with reduced component count.

For example, if the resin foam forming the wiper seal 17 is compressed in the thickness direction in order to maintain the hardness of the wiper seal 17 at an appropriate value, the firmness of the wiper seal 17 can be maintained to increase the durability even without the sealing plate 18.

In addition, the first embodiment comprises a tube member 19 as a reinforcing member for the purpose of preventing deformation of the end seal 14. The tube member 19 may not necessarily be required. However, provided that the tube member 19 is provided, even if a force resulting from sliding resistance and/or the like acts on the lip portion 14b, the rubber end seal 14 is much less likely to be entirely distorted.

Once the end seal 14 is distorted, not only the sealing performance and the function of removing foreign substances will be degraded in a region around the wiper seal 17, but also the sealing performance will be degraded in the lip portion 14b. However, the use of the tube member 19 avoids causing such events. In particular, when the distance between the recess bottom face 14c and the scraper 9 is increased by mounting a plurality of the wiper seals 17 in the end seal 14, the provision of the tube member 19 is effective. The reinforcing member of the present invention is not limited to the tube member, and may be a bar-shaped member having a predetermined length.

The first embodiment has described one example that the two wiper seals 17 are mounted in each end seal 14, but a wiper seal 7 or the three wiper seals 17 or more may be mounted in each end seal 14. In such cases, the depth of the recessed portion of the end seal 14 must be adjusted in accordance with the number of wiper seals 17 mounted in the end seal 14 so that the wiper seals 17 can be fixedly held between the scraper 9 and the recess bottom face 14c.

Figure 6:
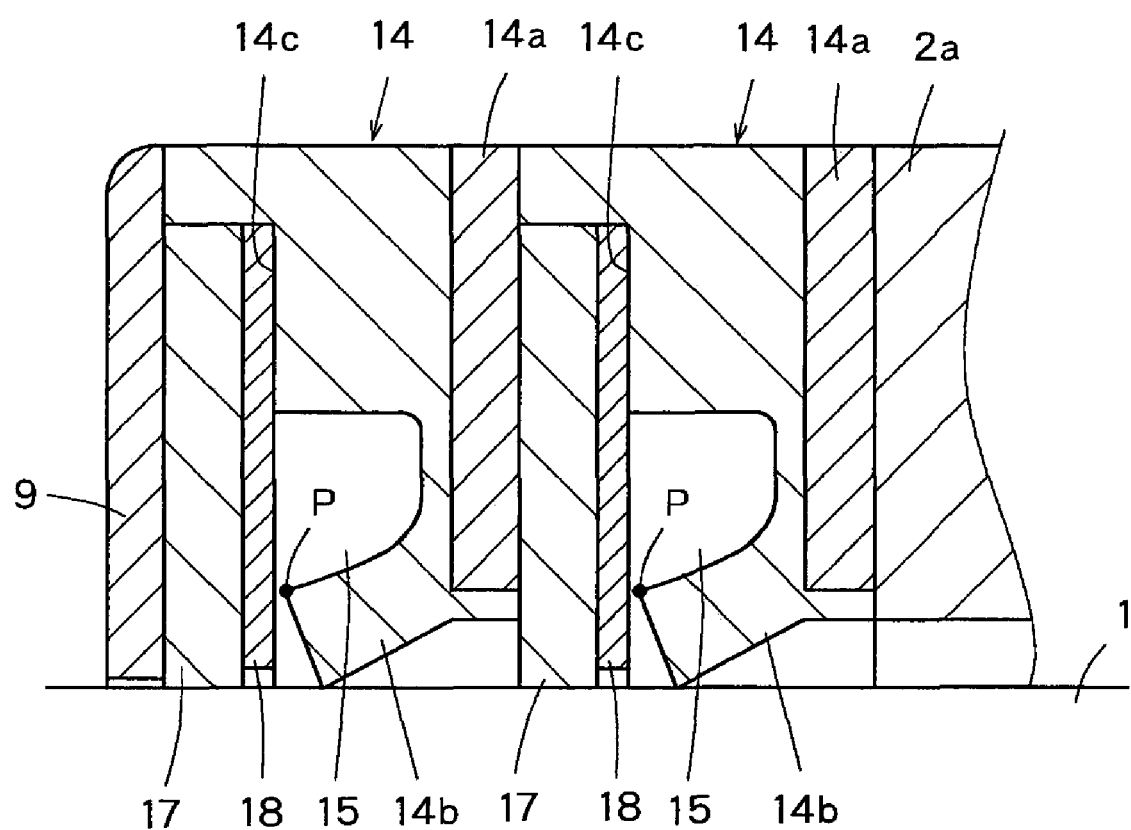
FIG. 6 is a sectional view of a sealing area in a second embodiment.

In a linear motion guide unit of a second embodiment illustrated in FIG. 6, a sealing plate 18 and a wiper seal 17 are mounted in an end seal 14, and then the two end seals 14 are attached to the outer side of each of the end caps 2a of the slider 2 which is identical with that of the first embodiment illustrated in FIG. 1. Then, the scraper 9 is attached to the outermost situated one of the two end seals 14.

In the second embodiment, a wiper seal 17 is mounted in each of the end seals 14, so that the depth of the recess portion is shallower than that of the end seal 14 of the first embodiment by a length corresponding to the thickness of a wiper seal 17. The structure of other components is the same as that of the first embodiment. The same structural elements of the second embodiment as those of the first embodiment are described using the same reference numerals.

An end seal 14 of the second embodiment also has one side which is a mounting face attached to the slider 2, and the other side which is opposite to the mounting face and in which a recessed portion having a recess bottom face 14c (i.e., the bottom face of the recessed portion) is formed. A sealing plate 18 is mounted in the recessed portion in such a manner as to be in contact with the recess bottom face 14c. Then, a wiper seal 17 is mounted by being placed on the outer side of the sealing plate 18. Then, a first end seal 14 thus assembled is attached directly to the outer side of each of the end caps 2a, and then a second end seal 14 also assembled is attached to the outer side of the first end seal 14. Then, the scraper 9 is attached to the outer side of the second end seal 14. Finally, the first end seal 14, the second seal 14 and the scraper 9 are secured to the slider 2 with bolts, not shown. In the second embodiment, the second end seal 14 corresponds to an outermost situated end seal of the present invention.

The wiper seal 17 and the sealing plate 18, which are mounted in the first end seal 14, are held between the second end seal 14 and the recess bottom face 14c of the first end seal 14. The wiper seal 17 and the sealing plate 18, which are mounted in the second end seal 14, are held between the scraper 9 and the recess bottom face 14c of the second end seal 14.

The linear motion guide unit structured as described above is provided with the two lip portions 14b of the respective end seals 14 and the two wiper seals 17 on each of the end caps, thus offering higher sealing performance than that in the first embodiment.

The linear motion guide unit of the second embodiment provided with the two end seals 14 and the two wiper seals 17 on each end cap can be reduced in size in the sliding direction as well as in component count as compared with the case of having two sealing structures provided in the conventional linear motion guide unit illustrated in FIG. 8.

Any number of end seals 14 can be mounted on each end of the slider 2. The larger the number of end seals, the higher the sealing performance becomes. When a large number of end seals 14 are mounted, the scraper 9 is attached to only the outer side of the outermost situated end seal 14. About the other end seals 14, one end seal 14 is attached directly to the outer side of an end seal 14 adjacent thereto such that a wiper seal 17 and a sealing plate 18 are held between adjacent end seals 14.

The length of the slider 2 in the sliding direction is longer as the number of end seals 14 is increased. However, the component count and the length in the sliding direction can be reduced by eliminating the need for the mounting plate 5 and the assembly 6 which are conventionally used.

Note that, in the second embodiment, the end seal 14 has reinforcing ribs formed thereon and through-holes formed therein, and a bar-shaped reinforcing member is provided in the through-hole, which are not graphically expressed. In particular, since the second embodiment comprises a plurality of the end seals 14, the length of the sealing mechanism in the sliding direction is increased. However, by providing the bar-shaped reinforcing member passing through all the end seals 14, the second embodiment offers a great advantage in that the whole length can remain unchanged so that deformation can be prevented. Even when a plurality of the end seals 14 are provided as in the second embodiment, the bar-shaped reinforcing member is not an essential element.

The function of the sealing plate 18 in the second embodiment is the same as that of the first embodiment, and the sealing plate 18 may not be provided as in the case of the first embodiment.

In the first and second embodiments, the depth of a recessed portion formed in an end seal 14 is determined in accordance with the thickness of a sealing plate 18 and a wiper seal 17 which are mounted in the recessed portion. If the depth of the recessed portion is somewhat smaller than the thickness of the wiper seal 17 in a natural state, the wiper seal 17 is fixedly interposed in a compressed state between the recess bottom face 14c of the end seal 14 and the scraper 9 or between the end seals 14. As a result, the wiper seal 17 can be reliably held.

What is claimed is:

1. A linear motion guide unit, comprising:
   a guide rail having a guiding face extending in a longitudinal axial direction;
   a slider straddling and sliding on the guide rail;
   an end seal attached to each of opposing end faces of the slider including a portion made of rubber straddling the guide rail, wherein the end seal has a recessed portion formed in an outer face opposite to a mounting face attached to a respective end face of the slider, the recessed portion including a bottom face axially recessed from the outer face of the end seal, the end seal includes a protruding portion extending between the bottom face of the recessed portion of the end seal and the outer face of the end seal and at least partially surrounding the bottom face of the recessed portion, and said straddling portion of the end seal having a contact face including a lip portion formed thereon, proximate to the mounting face and extending toward the recessed portion, configured to be pressed against the guiding face of the guide rail; and
   a wiper seal provided in the recessed portion of each end seal and impregnated with oil;
   a metallic sealing plate interposed between the bottom face of the recessed portion of each end seal and each respective wiper seal;
   the lip portion being located closer to the slider than the bottom face of the recessed portion is;
   each wiper seal impregnated with oil being mounted in a respective one of the recessed portions, said wiper seal being a sheet-shaped member produced by compressively molding a polyester-based polyurethane foam in a thickness direction; and
   a scraper disposed along an outer side of the wiper seal mounted in each recessed portion, so that the wiper seal is fixedly interposed between the scraper and the bottom face of the recessed portion.

2. The linear motion guide unit according to claim 1, wherein
   a through-hole is drilled through each end seal, and
   a bar-shaped reinforcing member is inserted through the through-hole.

3. A linear motion guide unit, comprising:
   a guide rail having a guiding face extending in a longitudinal axial direction;
   a slider straddling and sliding on the guide rail;
   a plurality of end seals attached to each of opposing end faces of the slider, each of the end seals including a portion made of rubber straddling the guide rail, wherein each of the end seals has a recessed portion formed in an outer face opposite to a mounting face facing a respective end face of the slider, each of the recessed portions including a bottom face recessed axially from the outer face of the end seal, each of the end seals includes a protruding portion extending between the bottom face of the recessed portion of the end seal and the outer face of the recessed portion of the end seal and at least partially surrounding the bottom face of the recessed portion, and said straddling portion of the end seal having a contact face including a lip portion formed thereon, proximate to the mounting face and extending toward the recessed portion, configured to be pressed against the guiding face of the guide rail; and
   a wiper seal provided in the recessed portion of each of the end seals and impregnated with oil;
   a metallic sealing plate interposed between the bottom face of the recessed portion of each of said end seals and a respective wiper seal provided on the outer side of the end seal;
   each of the lip portions being located closer to the slider than the bottom face of the corresponding recessed portion is;
   each wiper seal impregnated with oil being mounted in the corresponding recessed portion of a respective end seal, each wiper seal being a sheet-shaped member produced by compressively molding a polyester-based polyurethane foam in a thickness direction;
   the plurality of end seals of each respective end face of the slider being placed on one another so that a respective one of the wiper seals is fixedly interposed between the end seals; and
   a scraper disposed along the outer side of the wiper seal mounted in the recessed portion of an outermost situated end seal of the plurality of the end seals of each end face of the slider, so that the wiper seal of the outermost situated end seal is fixedly interposed between the scraper and the bottom face of the recessed portion.

4. The linear motion guide unit according to claim 3, wherein
   a through-hole is drilled through the end seal, and
   a bar-shaped reinforcing member is inserted through the through-hole.

* * * * *